(12) United States Patent
Tian et al.

(10) Patent No.: US 11,787,670 B1
(45) Date of Patent: Oct. 17, 2023

(54) CONTROL METHOD, CONTROL SYSTEM, AND DEVICE FOR GRAB OF PORTAL CRANE

(71) Applicant: JIANGSU SUGANG INTELLIGENT EQUIPMENT INDUSTRY INNOVATION CENTER CO., LTD., Jiangsu (CN)

(72) Inventors: Zhao Tian, Jiangsu (CN); Zhongjian She, Jiangsu (CN); Jinqi Wan, Jiangsu (CN); Zhaoyun Li, Jiangsu (CN); Qingyong Tao, Jiangsu (CN); Hailei Wang, Jiangsu (CN); Kai Yang, Jiangsu (CN); Chigeng Zhang, Jiangsu (CN)

(73) Assignee: JIANGSU SUGANG INTELLIGENT EQUIPMENT INDUSTRY INNOVATION CENTER CO., LTD.

( * ) Notice: Subject to any disclaimer, the term of this patent is extended or adjusted under 35 U.S.C. 154(b) by 0 days.

(21) Appl. No.: 18/136,382

(22) Filed: Apr. 19, 2023

(30) Foreign Application Priority Data

Apr. 19, 2022 (CN) .......................... 202210410227.8

(51) Int. Cl.
*B66C 13/48* (2006.01)
*B66C 13/46* (2006.01)
*B66C 5/10* (2006.01)
*G06T 7/70* (2017.01)
*B66C 13/16* (2006.01)

(52) U.S. Cl.
CPC ............... *B66C 13/48* (2013.01); *B66C 5/10* (2013.01); *B66C 13/16* (2013.01); *B66C 13/46* (2013.01); *G06T 7/70* (2017.01); *G06T 2207/10028* (2013.01)

(58) Field of Classification Search
None
See application file for complete search history.

(56) References Cited

U.S. PATENT DOCUMENTS

| 4,216,868 A | 8/1980 | Geppert |
| 9,878,885 B2 * | 1/2018 | Scheider ................. B66C 23/84 |
| 10,046,953 B2 * | 8/2018 | Schneider ............. B66C 13/063 |

FOREIGN PATENT DOCUMENTS

| CN | 203392776 U | 1/2014 |
| CN | 104909273 A | 9/2015 |
| CN | 113213345 A | 8/2021 |
| CN | 113610833 A | 11/2021 |

* cited by examiner

*Primary Examiner* — Todd Melton
(74) *Attorney, Agent, or Firm* — Cooper Legal Group, LLC (57) ABSTRACT

The present application discloses a control method, a control system, and a device for a grab of a portal crane. The control method for a grab of a portal crane includes: acquiring a height information of the grab; acquiring an amplitude variation information of a luffing mechanism; acquiring a slewing angle information of a rotation of a slewing mechanism; determining a horizontal relative position information of the grab relative to a center point of the slewing mechanism according to the amplitude variation information and the slewing angle information; determining an actual position information of the grab relative to the center point of the slewing mechanism according to the horizontal relative position information and the height information; acquiring a scanning information of a hull, and determining a position information of a material; and planning an operation route of the grab.

9 Claims, 4 Drawing Sheets

CONTROL METHOD, CONTROL SYSTEM, AND DEVICE FOR GRAB OF PORTAL CRANE

CROSS-REFERENCE TO RELATED APPLICATION

This application claims the priority to Chinese patent application No. 202210410227.8, filed on Apr. 19, 2022. The entirety of Chinese patent application No. 202210410227.8 is hereby incorporated by reference herein and made a part of this specification.

FIELD OF THE INVENTION

The present application relates to a technical field of portal crane control, in particular to a control method, a control system, and a device for a grab of a portal crane.

DESCRIPTION OF RELATED ART

A portal crane refers to a kind of jib-type crane in which a rotatable lifting device (short for a rotatable part) is mounted on a gantry. The portal crane is operated mostly along a crane track on the ground or buildings to carry out loading and unloading operations. Moreover, the portal crane is mainly used for port machinery operations.

In the related art, a portal crane generally includes a hoisting mechanism, a luffing mechanism and a slewing mechanism. Among them, the hoisting mechanism includes a reel, a wire rope, a pulley and a grab. The wire rope is wound on the reel and connected to the reel. And an end of the wire rope away from the reel passes through the pulley and is connected to the grab. The reel is able to be rotated under a driving effect of an external power source, and then rewinds or unwinds the wire rope, so as to realize a height adjustment of the grab. The rewinding and unwinding of the wire rope is guided by the pulley. The luffing mechanism mainly includes a tension bar, a jib and a trunk girder. Both the tension bar and the jib are hinged to the slewing mechanism through a articulated shaft, and the ends of the tension bar and the jib away from the articulated shaft are hinged to the trunk girder. The pulley is installed on the end of the trunk girder away from the tension bar. The slewing mechanism is connected with a second gear ring (larger gear ring), and several first gear rings (smaller gear ring) are engaged with the second gear ring. The second gear ring is able to be rotated under a driving effect of a power source, and several first gear rings is rotated around the second gear ring. At the same time, the slewing mechanism is rotated synchronously with the second gear ring to drive the luffing mechanism to rotate, so that the grab is moved synchronously with the rotation of the luffing mechanism.

The portal crane needs cooperation of three movements of lifting, luffing and slewing to form an operation track during a transportation process. At present, in the loading and unloading operation of the portal crane, a position of the grab is generally controlled by an operator through observing the position of the material on the cabin with the naked eye. During this process, the operator needs to continuously adjust a slewing angle, a luffing amplitude, and a height of the grab to realize a grabbing operation of the grab.

In the loading and unloading operation, the manual observation of the position of the grab has a low accuracy, and the grab needs to be adjusted repeatedly and continuously, which increases the work intensity of operators, affecting the loading and unloading efficiency of materials.

BRIEF SUMMARY OF THE PRESENT APPLICATION

The present application provides a control method, a system, a device and a storage medium for a grab of a portal crane.

In a first aspect, the present application provides a control method for a grab of a portal crane, including:
  acquiring a height information of the grab;
  acquiring an amplitude variation information of a luffing mechanism;
  acquiring a slewing angle information of a rotation of a slewing mechanism;
  determining a horizontal relative position information of the grab relative to a center point of the slewing mechanism according to the amplitude variation information and the slewing angle information;
  determining an actual position information of the grab relative to the center point of the slewing mechanism according to the horizontal relative position information and the height information;
  acquiring a scanning information of a hull, and determining a position information of a material according to the scanning information of the hull; and
  planning an operation route of the grab according to the actual position information and the position information of the material.

In some embodiments, acquiring a height information of the grab includes:
  acquiring a rotation direction of a reel, a slewing angle of the reel and a height of a pulley, respectively;
  calculating a variation of a wire rope according to the rotation direction of the reel and the slewing angle of the reel;
  determining the height information of the grab according to the variation of the wire rope.

In some embodiments, acquiring an amplitude variation information of a luffing mechanism includes:
  acquiring a slewing angle of a jib;
  retrieving an initial inclination angle of the jib and a length of the jib from a pose database, and the initial inclination angle of the jib corresponds to an inclination angle of the jib when the portal crane is at a maximum working amplitude; and
  calculating a horizontal distance between a front end of the jib and a center point of the slewing mechanism, and setting the horizontal distance the amplitude variation information of the luffing mechanism, according to a slewing angle of the jib, the initial inclination of the jib and the length of the jib.

In some embodiments, acquiring a slewing angle information of a rotation of a slewing mechanism includes:
  acquiring a slewing angle of a first gear ring;
  calculating a slewing angle of a second gear ring according to the slewing angle of the first gear ring, and setting the slewing angle of the second gear ring as the slewing angle of a rotation of the slewing mechanism.

In some embodiments, determining a position information of a material according to the scanning information of the hull includes:
  acquiring a first angle scanning information of a first angle of the hull, and generating a first hull point cloud according to the first angle scanning information;

acquiring a second angle scanning information of a second angle of the hull, and generating a second hull point cloud according to the second angle scanning information;

combining the first hull point cloud and the second hull point cloud to generate an actual hull point cloud; and acquiring the position information of the material according to the actual hull point cloud.

In some embodiments, planning an operation route of the grab includes:

acquiring a point cloud of a target material area in the actual hull point cloud in real time;

dividing the point cloud of the target material area into a plurality of material area images;

calculating an average point cloud height of all the material area images, and finding out a material area corresponding to a biggest point cloud height in all the material area images;

setting the material area corresponding to the biggest point cloud height as an operation point of the grab; and controlling the grab to operate according to a preset grabbing route by using the operating point of the grab as a starting point.

In some embodiments, controlling the grab to operate according to a preset grabbing route includes:

calculating a difference between a point cloud height of a target material area image and a point cloud height of an adjacent material area image, when the grab is moved to a material area corresponding to the target material area image;

moving the grab to a temporary material area corresponding to a difference greater than a preset standard height difference, if the difference is greater than the preset standard height difference; and performing grabbing in the temporary material area, moving the grab to the material area corresponding to the target material area image, and controlling the grab to operate according to the preset grabbing route.

In a second aspect, the present application provides an control system for a grab of a portal crane, including:

a height acquiring module, configured for acquiring a height information of the grab;

an amplitude acquiring module, configured for acquiring an amplitude variation information of a luffing mechanism;

an angle acquiring module, configured for acquiring a slewing angle information of a rotation of a slewing mechanism;

a position determination module, configured for determining a horizontal relative position information of the grab relative to a center point of the slewing mechanism according to the amplitude variation information and the slewing angle information;

a grab positioning module, configured for determining an actual position of the grab relative to the center point of the slewing mechanism according to the horizontal relative position information and the height information;

a material positioning module, configured for acquiring a scanning information of a hull, and determining a position information of a material according to the scanning information of the hull; and a route planning module, configured for planning an operation route of the grab according to the actual position information and the position information of the material.

In a third aspect, the present application provides a computer device, including a memory and a processor, wherein a computer program is stored on the memory, and the computer program can be loaded by the processor and execute the control method for a grab of a portal crane described above.

In a fourth aspect, the present application provides a computer-readable storage medium, including a computer program capable of being loaded by the processor and execute the control method for a grab of a portal crane described above.

To sum up, the present application is able to achieve at least one of the following beneficial technical effects:

1. the actual position information of the grab relative to the center point of the slewing mechanism is calculated according to the height of the grab, the amplitude variation of the luffing mechanism and the slewing angle of the slewing mechanism. Then the position of the material is determined according to the obtained scanning information of the hull. At this time, the operation route of the grab is planned according to the actual position information of the grab relative to the center point of the slewing mechanism and the position information of the material. So an automated positioning and route planning of the grab is realized, to replace a manual observation and adjustment of the position of the grab, which is time-saving and labor-saving, improving the working efficiency of the grab;
2. the height of the grab is determined by measuring the variation of the wire rope and the height of the reel. The measurement results are accurate, and the measurement efficiency is high; and
3. a grabbing is first performed for the material area with higher point cloud in two adjacent material area images, improving the operation efficiency of the grab, which helps to prevent the grab from being pressed into the materials and unable to work when the materials in the material area corresponding to the material area image with a higher point cloud height collapses.

DETAILED DESCRIPTION

The present application will be further described in detail below by reference to FIGS. 1-4.

The embodiment of the present application discloses a control method for a grab of a portal crane. This control method is applied to a portal crane. The portal crane runs along a crane track on the ground. A PLC central processing unit is provided in the portal crane. The start/stop of the hoisting mechanism of the crane, the start/stop of the luffing mechanism, the start/stop of the slewing mechanism, and the grabbing operation of the grab are controlled by the PLC central processing unit.

Figure 1:
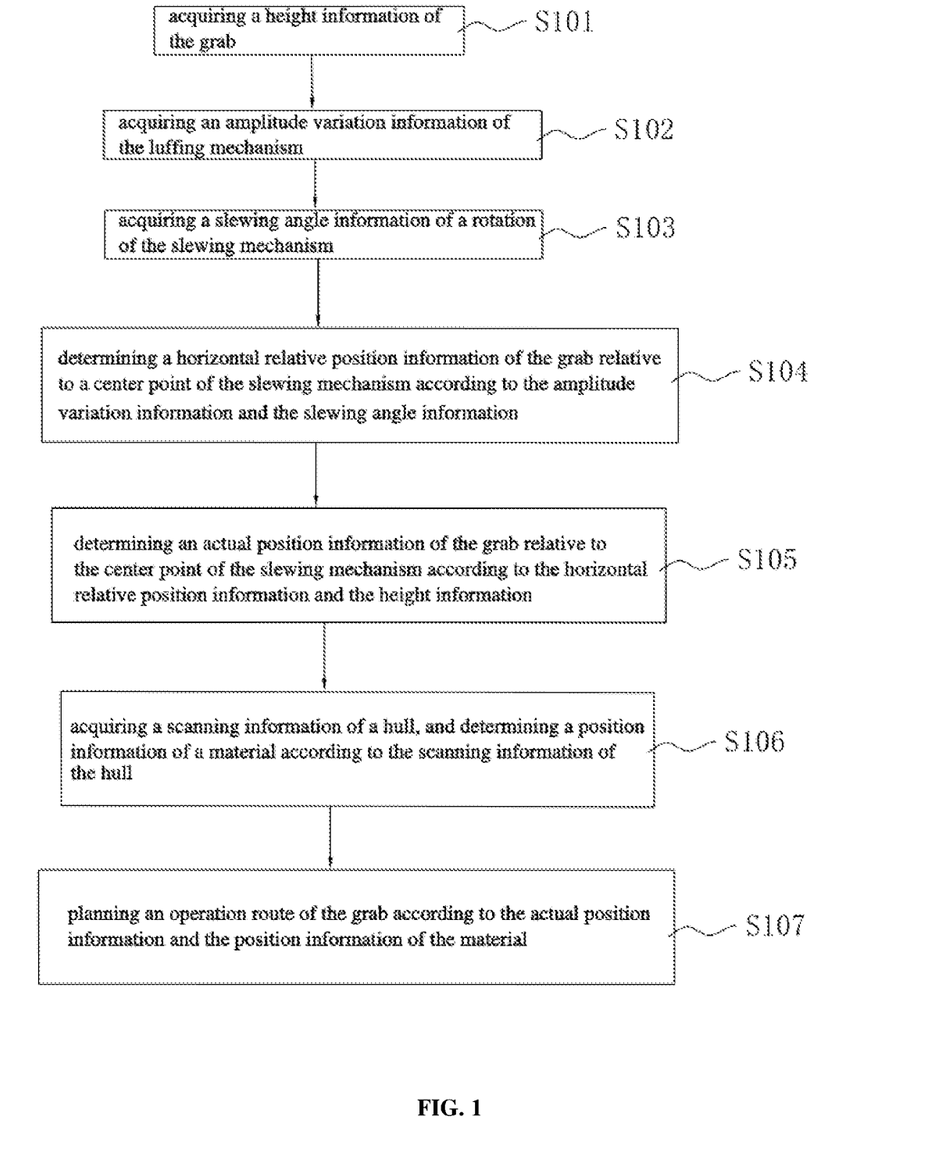
FIG. 1 is a control method for a grab of a portal crane according to an embodiment of the present application.

As shown in FIG. 1, the control method includes the following steps:

S101, acquiring a height information of the grab.

Specifically, a three-dimensional coordinate system is established with the center point of the slewing mechanism as the origin (0,0). The Y-axis of the three-dimensional coordinate system is the line where the central axis of the track is located, and the X-axis of the three-dimensional coordinate system is the projection line of the center line of the slewing mechanism on the horizontal plane. The X axis and the Y axis are perpendicular to each other, and the origin (0,0) is the intersection between the central axis of the track and the projection line of the center line of the slewing mechanism on the horizontal plane. Therefore, the height information of the grab is the height of the grab relative to the origin (0,0) of the three-dimensional coordinate system.

S102: Acquiring an amplitude variation information of the luffing mechanism.

Specifically, the luffing mechanism is configured to adjust the distance between the grab and the center point of the slewing mechanism. When the jib moves under the driving of the power source, the horizontal distance between the grab and the center point of the slewing mechanism will change synchronously. At this time, the horizontal distance between a outer edge of the grab and the center point of the slewing mechanism is the amplitude variation of the luffing mechanism.

S103, acquiring a slewing angle information of a rotation of the slewing mechanism.

Specifically, the slewing angle of a rotation of the slewing mechanism is the angle between the grab and the origin (0,0) of the three-dimensional coordinate system.

S104: determining a horizontal relative position information of the grab relative to a center point of the slewing mechanism according to the amplitude variation information and the slewing angle information.

Specifically, the amplitude variation and the slewing angle are marked on the three-dimensional coordinate system. The angle between the projection line of the jib on the horizontal plane and the X-axis is the slewing angle. The straight line where the amplitude variation is located is on the X-axis. The coordinate (x, y) of the grab relative to the origin of the three-dimensional coordinate system is calculated according to the amplitude variation and the slewing angle on the three-dimensional coordinate system. And the coordinate (x, y) of the grab is the horizontal relative position information of the grab relative to the center point of the slewing mechanism.

S105, determining an actual position information of the grab relative to the center point of the slewing mechanism according to the horizontal relative position information and the height information.

Specifically, a three-dimensional space coordinate (x, y, z) of the grab relative to the origin of the three-dimensional coordinate system is determined according to the grab coordinate (x, y) and the height information of the grab. The actual position information of the grab is the three-dimensional coordinate (x, y, z) of the grab, and z value in the three-dimensional coordinate (x, y, z) of the grab is the height of the grab.

S106, acquiring a scanning information of a hull, and determining a position information of a material according to the scanning information of the hull.

Specifically, the hull is scanned by a laser pan-tilt scanner to obtain the scanning image of the hull. The scanning information of the hull is the scanning image of the hull. Then, the material position information on the scanning image of the hull is determined and obtained according to the scanning image of the hull.

S107, planning an operation route of the grab according to the actual position information and the position information of the material.

Specifically, all the features on the scanning image of the hull are marked on the three-dimensional space coordinate (x, y, z) of the grab. The PLC central processing unit has a preset routing rules, and then the working route of the grab may be planned according to the routing rules, so that grabbing the material is able to be performed automatically.

The control method of the grab described above steps realizes the automated positioning and route planning of the grab, so that the material loading and unloading operation can be quickly completed by the grab, which is time-saving and labor-saving, improving the working efficiency of the grab.

In an embodiment, since the grab is connected to the reel through a wire rope, a laser ranging sensor is generally installed at the end of the trunk girder, in order to measure the height of the grab conveniently. The laser ranging sensor is configured to measure the distance between the end of the trunk girder and the grab, and the height of the grab from the ground can be calculated by subtracting the distance between the trunk girder and the grab from the height of the trunk girder from the ground. The height of the trunk girder from the ground is fixed. Because the height of the grab is adjusted by winding the wire rope, the grab may shakes during the operation process, which may easily lead to errors in the calculated height of the grab. Considering the accuracy of the height measurement result of the grab, the following treatments can be performed:

First, a rotation direction and a rotation angle of the reel can be obtained, respectively, by using an absolute encoder provided at the reel; then the height of the pulley from the ground can be measured by using a ranging equipment. The height of the pulley from the ground is the Z value of the pulley in the three-dimensional coordinate system. The ranging equipment may be a laser ranging sensor, an infrared ranging sensor, etc.;

Then a lifting state of the reel may be determined according to the rotation direction of the reel, and a variation of the wire rope may be calculated from the rotation angle of the reel and the reeling/unreeling length corresponding to the unit rotation angle of the reel. For example, a clockwise rotation of the reel corresponds to unreeling, and the corresponding reeling/unreeling length for each 1° rotation of the reel is a, then the situation corresponding to a 180° clockwise rotation of the reel is that the wire rope is unreeled by a length of 180a, that is, the grab descends a distance of 180a;

Then, the height information of the grab can be determined according to the height of the pulley and the variation of the wire rope; based on the above example, if the height of the pulley in the initial state is h1 and the variation of the wire rope is 180a, then the height of the grab from the ground can be calculated as h1-180a.

It should be noted that the above method for measuring the height of the grab is based on a situation that the grab is first placed on the ground, then the height of the grab is adjusted, and the height of the grab is determined according to the variation of the wire rope. So a grab height finally obtained is the height of the grab under an ideal vertical state of the wire rope, which reduces the difficulty in accurately determining a height of the grab by a traditional laser ranging sensor, caused by shaking of the wire rope under an external force, improving the accuracy of determining the height of the grab.

In an embodiment, in order to improve a computing efficiency of calculating the height of the grab and obtain the height information of the grab, the following steps may also be performed:

acquiring the slewing angle of the reel;
retrieving a diameter D of the reel from a reel information database;
converting the slewing angle $\alpha 1$ to the height h of the grab according to a preset algorithm formula (1);
the algorithm formula (1) is as follows: $h=\pi \times D \times (\alpha 1/360°)$ Specifically, the slewing angle $\alpha 1$ of the reel can be obtained by using the absolute encoder set at a shaft end of the reel, and then the slewing angle $\alpha 1$ of the reel can be converted directly according to the algorithm formula (1) to the height of the grab from the ground. The calculation is simple and convenient, the calculation amount is reduced, and the efficiency of measuring the height of the grab is improved. Additionally, above steps are based on a situation that the reel is first adjusted to a calibration position, that is, the absolute encoder is adjusted to an angle zero point, then the reel is rotated to rewind/unwind the wire rope, and the finally the height of the grab is calculated. This method has a high accuracy. In this embodiment, the calibration position (i.e. the angle zero point of the absolute encoder) corresponds to the height of the grab from the ground.

In this embodiment, the calibration position of the reel is adjusted by using a cam limit switch. Specifically, the cam of the cam limit switch is fixed coaxial with the shaft end of the drum. A plurality of contacts of the cam limit switch are installed on the static bracket, and the number of the plurality of contacts can be set according to actual needs. One of the plurality of contacts can be set as the calibration point. When the cam rotates synchronously with the reel, if the cam abuts the contact point corresponding to the calibration point, the adjustment of the calibration position of the reel is realized.

In addition, in this embodiment, it is assumed that the number of the contacts is 5, and the contacts correspond to 5 wire rope variations respectively, and the wire rope variations corresponding to the 5 contacts are pre-assigned in the PLC central processing unit. The wire rope variations corresponding to the 5 contacts are 0 m, 5 m, 10 m, 15 m, 20 m, respectively. When the cam abuts one of the contacts, the wire rope variation corresponding to the contact is directly obtained by the PLC central processing unit, through the action of the cam limit switch, and then the wire rope variation corresponding to the contact is compared with the actually measured wire rope variation by the PLC central processing unit. So a verification of the height of the grab is finally realized and the accuracy of a measured data is improved.

In an embodiment, in order to improve the efficiency of measuring the amplitude variation of the luffing mechanism and obtain the amplitude variation of the luffing mechanism, the following steps may be performed:

First, the slewing angle $\alpha 2$ of the jib is obtained by using an absolute encoder provided on a lower articulated shaft of the jib. A pose database containing parameters such as a length and an initial inclination angle of the jib is stored in the PLC central processing unit. When the portal crane is at a maximum working amplitude, the angle of the lower articulated shaft of the jib is set as the angle zero point of the absolute encoder. At this time, the angle $\alpha 2$ of the lower articulated shaft of the jib is set as the initial inclination angle of the jib $\beta 1$, and the initial inclination angle of the jib $\beta 1$ is a fixed value; then the length of the jib and the initial inclination angle of the jib $\beta 1$ are retrieved from the pose database, and the inclination angle of the jib $\beta$ after the jib is adjusted to a suitable angle is calculated from the slewing angle of the jib $\alpha 2$ and the initial inclination angle of the jib $\beta 1$, according to a preset algorithm formula (2) $\beta=\beta 1+\alpha 2$;

Finally, the horizontal distance between the front end of the trunk girder and the center point of the slewing mechanism is calculated from the slewing angle of the jib $\alpha 2$, the inclination angle of the jib $\beta$ and the length of the jib L1, according to a preset algorithm formula (3), and the horizontal distance is set as the amplitude variation information of the luffing mechanism.

Figure 2:
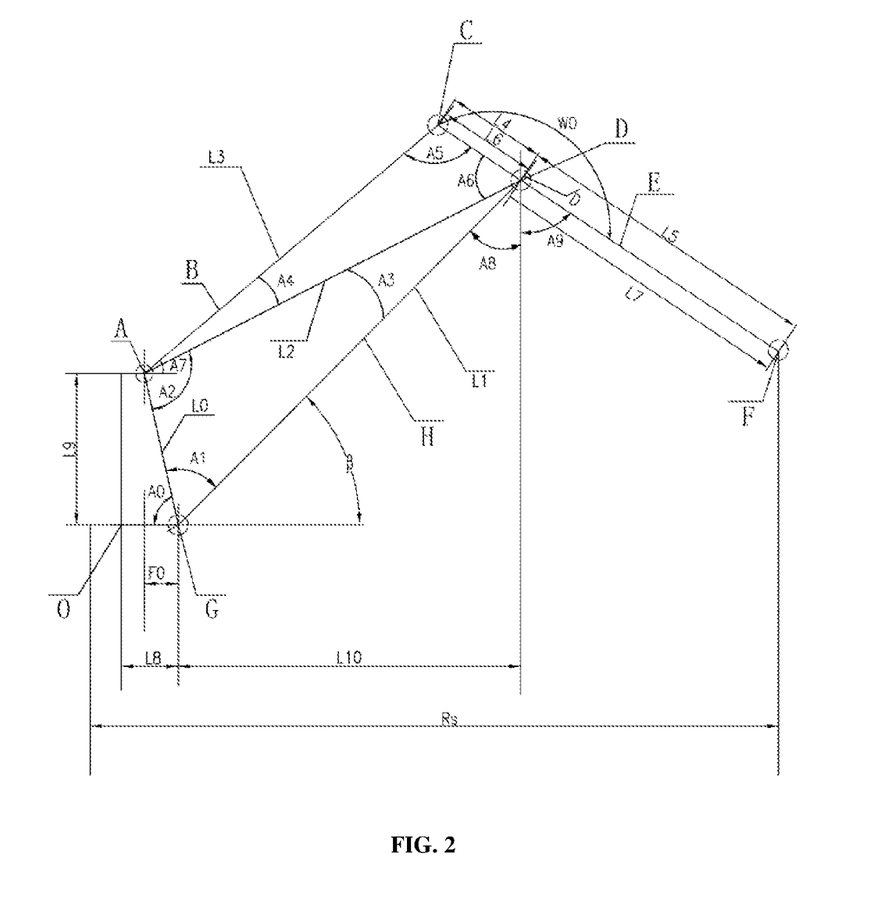
FIG. 2 is a schematic diagram of the specific structure of the crane according to an embodiment of the present application.

For example, as shown in FIG. 2, O is the center point of the slewing mechanism (that is, the origin (0,0) of the three-dimensional coordinate system); A is a lower articulated point of the tension bar; B is a tension bar; C is an articulated point between the tension bar and the trunk girder; D is an articulated point between the jib and the trunk girder; E is the trunk girder; F is the reel; G is the lower articulated point of the jib; H is the jib.

The algorithm formula (3) is as follows:

$L10=L1 \cos \beta$    $A8=\pi/2-\beta$

It is known that a length of a front part of the trunk girder is L5, a length of a second part of the trunk girder is L4, and a deflection of the trunk girder is D. Then:

$$L6=\sqrt{L4^2+D^2} \quad L7=\sqrt{L5^2+D^2} \quad W0=\arccos\frac{L6^2+L7^2-(L4+L5)^2}{2\times L6\times L7}$$

L9, L1, L8 are known. Then:

$$AO=\arctan\frac{L9}{L8} \quad A1=\pi-A0-\beta \quad L0=\sqrt{L8^2+L9^2}$$

$$L2=\sqrt{L0^2+L1^2-2L1\times L0\times COS(A1)}$$

$$A2=\arccos\frac{L2^2+L0^2-L1^2}{2\times L2\times L0} \quad A3=\pi-A1-A2$$

A length of the tension bar L3 is known. Then:

$$A6=\arccos\frac{L6^2+L2^2-L3^2}{2\times L6\times L2} \quad A9=2\pi-A8-A3-A6-W0$$

The distance from the lower articulated point of the jib to a center of the reel F0 is known, then the final working amplitude of the portal crane is as follows:

$RS=F0\div L10+\sin A9*L7$

Therefore, RS is the horizontal distance between the outer edge of the grab and the center point of the slewing mechanism.

Using above computational formulas, the horizontal distance between the outer edge of the grab and the center point of the slewing mechanism can be quickly calculated by directly measuring the slewing angle $\alpha 2$ of the lower articulated shaft of the jib, and according to the above algorithm formula (3). The arithmetic speed is fast, and the positioning efficiency and accuracy of the grab are improved.

In this embodiment, in order to improve the accuracy of measuring the slewing angle of the jib, an inclination sensor for measuring the slewing angle of the jib is provided at the root of the jib. The inclination sensor is used for auxiliary detection of the slewing angle of the jib, and an absolute encoder is used for the verification of the measured results, improving the accuracy of the data measurement.

In an embodiment, in order to acquire the slewing angle information of the slewing mechanism, the following process can be performed:

First, a slewing angle $\alpha 3$ of a first gear ring measured by the absolute encoder is obtained;

Then, a slewing angle $\gamma$ of the slewing mechanism (that is, the angle of the grab relative to the center point of the slewing mechanism) is calculated according to a preset algorithm formula (4). The preset algorithm formula (4) is as follows: $\gamma = r2 \times \alpha 3/r1$, in which r1 is the radius of the reference circle of the fixed second gear ring, r2 is the radius of the reference circle of the first gear ring of the reduction box. Then the slewing angle $\gamma$ of the slewing mechanism is set as the rotation angle of the second gear ring.

It should be noted that, the angle of the slewing mechanism is adjusted to the calibration position first, when it is necessary to adjust the angle of the grab relative to the center point of the slewing mechanism. The calibration position corresponds to the angle zero of the absolute encoder when the jib of the portal crane is oriented parallel to the track of a wharf.

In this embodiment, the calibration angle of the slewing mechanism may be adjusted by the following manners:

Two inductance approach switches are arranged on the slewing mechanism. The angle between the two inductance approach switches is 180°. An induction block is added to a platform of the slewing mechanism. The position where each inductance approach switch senses the induction block is a fixed slewing angle, that is, two fixed positions of +90° and −90°. When the slewing mechanism rotates to the corresponding angle, the corresponding inductance approach switch acts. An encoder of the slewing angle is assigned a value through an action of the inductance approach switch, so as to realize a position calibration of the slewing mechanism. The described calibration method has a simple structure and is convenient to operate.

In an embodiment, considering that there is a blind area in a single-angle scanning of the hull by the laser pan-tilt scanner, which leads to a situation that the grab easily collides with the hull during the grabbing process. So the following steps may be performed to determine a position information of a material according to the scanning information of the hull:

First, a laser pan-tilt scanning device is used to scan from a first angle to obtain a first angle scanning information of the hull. Meanwhile, the laser pan-tilt scanning device is used to scan from a second angle to obtain a second angle scanning information of the hull. The first angle and the second angle are different angles. For example, the first angle may be a angle from the top view direction from the hull, and the second angle may be the angle from the hull toward the coastline.

Then, a first hull point cloud is generated according to the first angle scanning information, and a second hull point cloud is generated according to the second angle scanning information; then the first hull point cloud and the second hull point cloud are combined to generate an actual hull point cloud. The first hull point cloud and the second hull point cloud may be combined by the following manner:

The features on the first hull point cloud and the second hull point cloud are analyzed and processed, respectively, a distinguishing features between the first hull point cloud and the second hull point cloud are found out, and marked to the first hull point cloud, then the actual hull point cloud is finally generated. The position information of the material can be obtained according to the actual hull point cloud.

It should be noted that, the scanning range is increased by scanning the hull from two angles. The obstacles located near the hull in the actual hull point cloud can be marked in advance, when planning the operation route of the grab, which helps to prevent the grab from colliding with the hull when grabbing materials, improving the efficiency of the grab.

Figure 3:
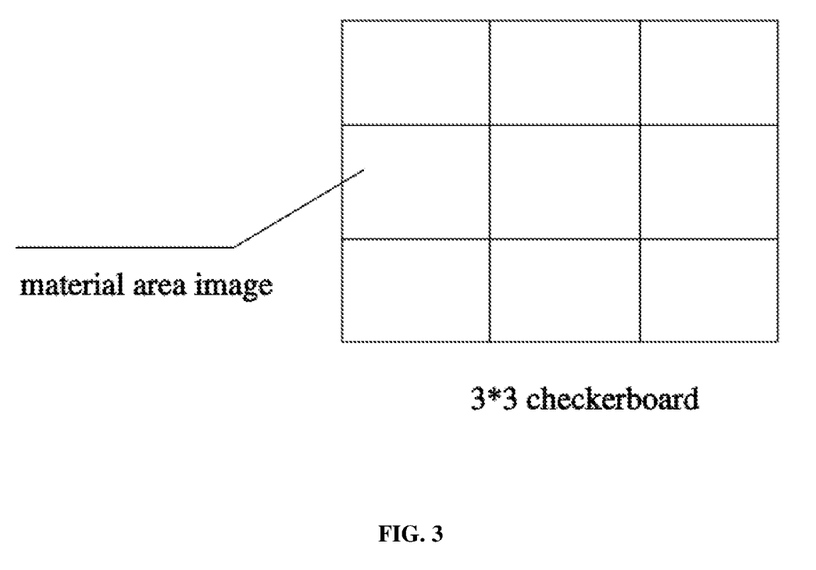
FIG. 3 is a schematic diagram of the specific structure of a checkerboard according to an embodiment of the present application.

In an embodiment, the working route of the grab may be planned by the following manner:

First, the point cloud of the target material area in the actual hull point cloud is obtained according to a preset image processing method; then, the point cloud of the target material area is divided into a plurality of material area images according to a preset image division rules. For example, as shown in FIG. 3, the point cloud of the target material area can be divided into a M*N checkerboard composed of a plurality of material area images. Specifically, the M*N checkerboards may be a 3*3 checkerboard.

Then an average point cloud height of all material area images in the checkerboard can be calculated by the PLC central processing unit, and a material area corresponding to a biggest point cloud height as an operating point of the grab; then the operating point is taken as a starting point to control the grab operation according to the preset grabbing route.

In an embodiment, considering that during the operation of the grab, if the height of the point cloud of the material area where the grab is located is smaller than the height of the point cloud of the material area around the grab, the surrounding materials are prone to collapse, which will cause the grab to be pressed into the material and affect the operation efficiency of the grab. To control the grab to operate according to the preset grabbing route, the following steps can be performed:

When the grab moves to the material area corresponding to the target material area image, the difference between the point cloud height of the target material area image and the point cloud height of the adjacent material area image is calculated first; and the difference is compared with a preset standard height difference. The grab is moved to a temporary material area corresponding to a difference greater than the preset standard height difference, if the difference is greater than the preset standard height difference. Then the grabbing is performed by the grab in the temporary material area under the control of the PLC central processor. After grabbing in temporary material area by the grab, the PLC central processing unit moves the grab to the material area corresponding to the target material area image again, and controls the grab to operate according to the preset grabbing route.

It should be noted that, a grabbing is first performed for the material area with higher point cloud in two adjacent material area images, which helps to prevent the grab from being pressed into the materials and unable to work when the materials in the material area corresponding to the material area image with a higher point cloud height collapses, improving the operation efficiency of the grab.

The implementation principle of the embodiment of the present application is as follows: the horizontal relative position information of the grab relative to the center point of the slewing mechanism is determined according to the amplitude variation of the luffing mechanism and the slewing angle of the slewing mechanism. The actual position of the grab relative to the center point of the slewing mechanism is determined according to the horizontal relative position information of the grab relative to the center point of the slewing mechanism and the height information. The automated positioning of the grab is realized. Meanwhile, the hull is scanned by the scanning equipment, and the position information of the material is determined according to the scanning information of the hull; finally, the operation route of the grab is planned according to the position information of the material and the actual position information, and according to the preset routing rule. By adopting the above method, the automated positioning of the grab and the planning of the operation route of the grab are realized, and a manual observation of the position of the grab is replaced. This method is time-saving and labor-saving, helps avoid ineffective operations of the grab, and improves the working efficiency and accuracy of the grab.

Based on the above method, the embodiment of the present application further discloses a control system for a grab of a portal crane.

Figure 4:
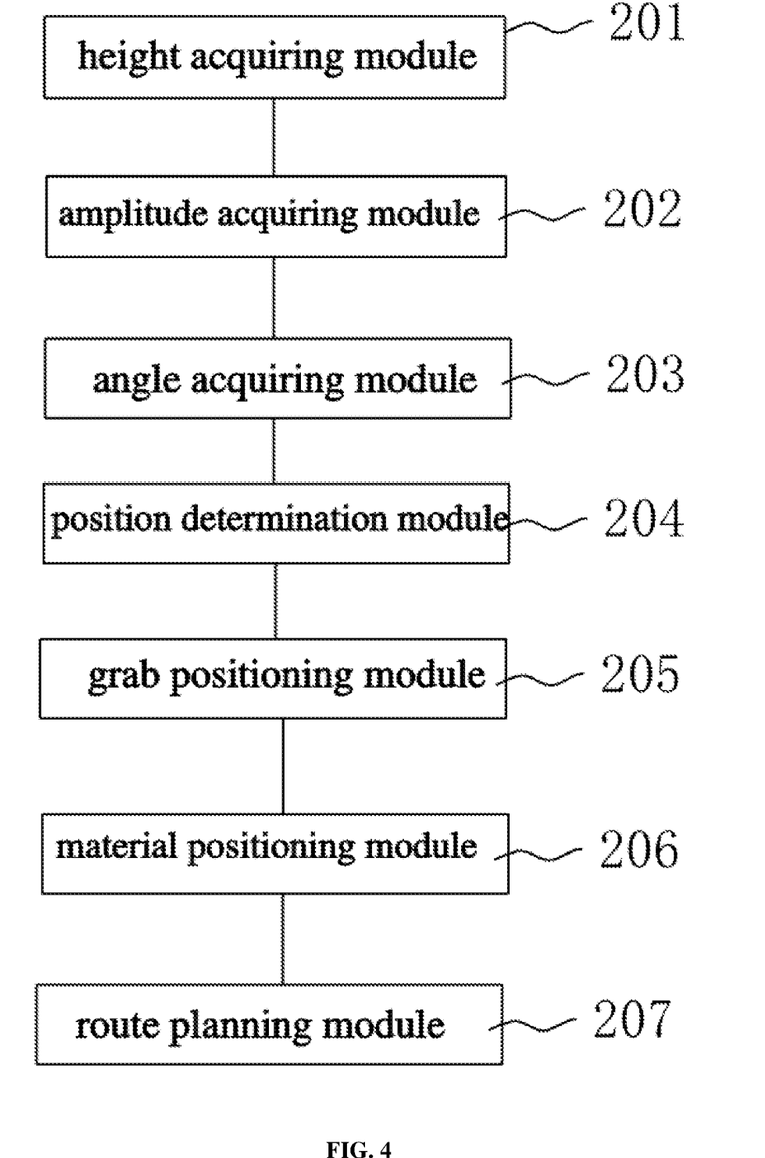
FIG. 4 is a structural block diagram of the control system for a grab of a portal crane according to an embodiment of the present application.

As shown in FIG. 4, the control system for a grab of a portal crane includes:
- a height acquiring module 201, configured for acquiring a height information of the grab;
- an amplitude acquiring module 202, configured for acquiring an amplitude variation information of a luffing mechanism;
- an angle acquiring module 203, configured for acquiring a slewing angle information of a rotation of a slewing mechanism;
- a position determination module 204, configured for determining a horizontal relative position information of the grab relative to a center point of the slewing mechanism according to the amplitude variation information and the slewing angle information;
- a grab positioning module 205, configured for determining an actual position of the grab relative to the center point of the slewing mechanism according to the horizontal relative position information and the height information;
- a material positioning module 206, configured for acquiring a scanning information of a hull, and determining a position information of a material according to the scanning information of the hull; and
- a route planning module 207, configured for planning an operation route of the grab according to the actual position information and the position information of the material.

In an embodiment, the height acquiring module 201 is further configured for:
acquiring a rotation direction of the reel, a rotation angle of the reel and the height of the pulley, respectively; calculating a variation of the wire rope according to the rotation direction of the reel and the rotation angle of the reel; determining a height information of the grab according to the variation of the wire rope.

In an embodiment, the amplitude acquiring module 202 is further configured to:
acquiring the rotation angle of the jib; retrieving an initial inclination of the jib and a length of the jib from the pose database in advance, in which the initial inclination of the jib corresponds to the inclination of the jib when the portal crane is at the maximum working amplitude; calculating the horizontal distance from the front end of the trunk girder to the center point of the slewing mechanism according to the rotation angle of the jib, the initial inclination of the jib and the length of the jib; and set the horizontal distance as the amplitude variation information of the luffing mechanism.

In an embodiment, the angle acquiring module 203 is further configured to:
acquiring a slewing angle of the first gear ring; calculating a slewing angle of the second gear ring according to the slewing angle of the first gear ring, and marking the slewing angle of the second gear ring as the slewing angle of the slewing mechanism.

In an embodiment, the material positioning module 206 is further configured to:
acquiring a first angle scanning information of the first angle of the hull, and generating a first hull point cloud according to the first angle scanning information; acquiring a second angle scanning information of a second angle of the hull, and generating a second hull point cloud according to the second angle scanning information; combining the first hull point cloud and the second hull point cloud to generate an actual hull point cloud; and acquiring the position information of the material according to the actual hull point cloud.

In an embodiment, the route planning module 207 is further configured to:
acquiring a point cloud of a target material area in the actual hull point cloud in real time; dividing the point cloud of the target material area into a plurality of material area images according to a preset image division rule; calculating an average point cloud height of all the material area images, and finding out a material area corresponding to a biggest point cloud height in all the material area images; setting the material area corresponding to the biggest point cloud height as an operation point of the grab; and controlling the grab to operate according to a preset grabbing route by using the operating point of the grab as a starting point.

In an embodiment, the route planning module 207 is further configured to:
calculating a difference between a point cloud height of a target material area image and a point cloud height of an adjacent material area image, when the grab is moved to a material area corresponding to the target material area image; moving the grab to a temporary material area corresponding to a difference greater than a preset standard height difference, if the difference is greater than the preset standard height difference; and performing grabbing in the temporary material area, moving the grab to the material area corresponding to the target material area image, and controlling the grab to operate according to the preset grabbing route.

The embodiment of the present application also discloses a computer device.

Specifically, the computer device includes a memory and a processor, in which a computer program is stored on the memory, and the computer program can be loaded by the processor and execute the control method for a grab of a portal crane described above.

The embodiment of the present application also discloses a computer-readable storage medium.

Specifically, the computer-readable storage medium stores a computer program capable of being loaded by the processor and execute the control method for a grab of a portal crane described above, and the computer-readable storage medium includes but not limited to, for example, a USB flash disk, a mobile hard disk, Read-Only Memory (ROM), Random Access Memory (RAM), magnetic disk or optical disk and other media that can store program codes.

The above specific embodiments are merely provided for an explanation to the present application, rather than imposing a limitation thereto. Upon reading the specification, those skilled in the art can make modifications to the embodiment based on needs without paying any creative contribution, which, as long as falling within the scope defined by the claims of the present application, will be protected by the patent law.

What is claimed is:

1. A control method for a grab of a portal crane, comprising:
    acquiring height information of the grab;
    acquiring amplitude variation information of a luffing mechanism;
    acquiring slewing angle information of a rotation of a slewing mechanism;
    determining horizontal relative position information of the grab relative to a center point of the slewing mechanism according to the amplitude variation information and the slewing angle information;
    determining actual position information of the grab relative to the center point of the slewing mechanism according to the horizontal relative position information and the height information;
    acquiring scanning information of a hull, and determining position information of a material according to the scanning information of the hull; and
    planning an operation route of the grab according to the actual position information and the position information of the material.

2. The control method for a grab of a portal crane according to claim 1, wherein acquiring the height information of the grab comprises:
    acquiring a rotation direction of a reel, a slewing angle of the reel and a height of a pulley, respectively;
    calculating a variation of a wire rope according to the rotation direction of the reel and the slewing angle of the reel; and
    determining the height information of the grab according to the variation of the wire rope.

3. The control method for a grab of a portal crane according to claim 1, wherein acquiring the amplitude variation information of the luffing mechanism comprises:
    acquiring a slewing angle of a jib;
    retrieving an initial inclination angle of the jib and a length of the jib from a pose database, wherein the initial inclination angle of the jib corresponds to an inclination angle of the jib when the portal crane is at a maximum working amplitude; and
    calculating a horizontal distance between a front end of a trunk girder and the center point of the slewing mechanism, and setting the horizontal distance as the amplitude variation information of the luffing mechanism, according to the slewing angle of the jib, the initial inclination angle of the jib and the length of the jib.

4. The control method for a grab of a portal crane according to claim 1, wherein acquiring the slewing angle information of the rotation of the slewing mechanism comprises:
    acquiring a slewing angle of a first gear ring; and
    calculating a slewing angle of a second gear ring according to the slewing angle of the first gear ring, and setting the slewing angle of the second gear ring as the slewing angle information of the rotation of the slewing mechanism.

5. The control method for a grab of a portal crane according to claim 1, wherein determining the position information of the material according to the scanning information of the hull comprises:
    acquiring first angle scanning information of a first angle of the hull, and generating a first hull point cloud according to the first angle scanning information;
    acquiring second angle scanning information of a second angle of the hull, and generating a second hull point cloud according to the second angle scanning information;
    combining the first hull point cloud and the second hull point cloud to generate an actual hull point cloud; and
    acquiring the position information of the material according to the actual hull point cloud.

6. The control method for a grab of a portal crane according to claim 5, wherein planning the operation route of the grab comprises:
    acquiring a point cloud of a target material area in the actual hull point cloud in real time;
    dividing the point cloud of the target material area into a plurality of material area images;
    calculating an average point cloud height of all the plurality of material area images, and finding out a material area corresponding to a biggest point cloud height in all the plurality of material area images;
    setting the material area corresponding to the biggest point cloud height as an operating point of the grab; and
    controlling the grab to operate according to a preset grabbing route by using the operating point of the grab as a starting point.

7. The control method for a grab of a portal crane according to claim 6, wherein controlling the grab to operate according to the preset grabbing route comprises:
    calculating a difference between a point cloud height of a target material area image and a point cloud height of an adjacent material area image when the grab is moved to a material area corresponding to the target material area image;
    moving the grab to a temporary material area corresponding to a difference greater than a preset standard height difference when the difference is greater than the preset standard height difference; and
    performing grabbing in the temporary material area, moving the grab to the material area corresponding to the target material area image, and controlling the grab to operate according to the preset grabbing route.

8. A computer device, comprising a memory and a processor, wherein a computer program is stored on the memory, and the computer program is configured to be loaded by the processor and execute the control method for a grab of a portal crane according to claim 1.

9. A control system for a grab of a portal crane, comprising:
    a height acquiring module, configured for acquiring height information of the grab;
    an amplitude acquiring module, configured for acquiring amplitude variation information of a luffing mechanism;
    an angle acquiring module, configured for acquiring slewing angle information of a rotation of a slewing mechanism;
    a position determination module, configured for determining horizontal relative position information of the grab relative to a center point of the slewing mechanism according to the amplitude variation information and the slewing angle information;
a grab positioning module, configured for determining actual position information of the grab relative to the center point of the slewing mechanism according to the horizontal relative position information and the height information;
a material positioning module, configured for acquiring scanning information of a hull, and determining position information of a material according to the scanning information of the hull; and
a route planning module, configured for planning an operation route of the grab according to the actual position information and the position information of the material.

* * * * *